(12) United States Patent
Pawlik

(10) Patent No.: US 12,219,264 B1
(45) Date of Patent: Feb. 4, 2025

(54) IMAGE SIGNAL PROCESSOR DAY-NIGHT DETECTION

(71) Applicant: Amazon Technologies, Inc., Seattle, WA (US)

(72) Inventor: Bartlomiej Pawlik, Singapore (SG)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 334 days.

(21) Appl. No.: 17/940,604

(22) Filed: Sep. 8, 2022

(51) Int. Cl.
 *H04N 23/71* (2023.01)
 *H04N 9/77* (2006.01)
 *H04N 23/72* (2023.01)
 *H04N 23/88* (2023.01)

(52) U.S. Cl.
 CPC .............. *H04N 23/71* (2023.01); *H04N 9/77* (2013.01); *H04N 23/72* (2023.01); *H04N 23/88* (2023.01)

(58) Field of Classification Search
 CPC .......... H04N 23/71; H04N 9/77; H04N 23/72; H04N 23/88
 See application file for complete search history.

(56) References Cited

U.S. PATENT DOCUMENTS

| | | | | |
|---|---|---|---|---|
| 2014/0078315 A1* | 3/2014 | Carlsson | ............... | H04N 23/60 348/187 |
| 2014/0192223 A1* | 7/2014 | Nakade | ..................... | G06T 5/92 348/223.1 |
| 2022/0182525 A1* | 6/2022 | Lv | .......................... | H04N 23/71 |
| 2023/0300307 A1* | 9/2023 | Nishio | ..................... | H04N 9/73 348/223.1 |

* cited by examiner

*Primary Examiner* — Fabio S Lima
(74) *Attorney, Agent, or Firm* — K&L Gates LLP

(57) ABSTRACT

Approaches are described for image signal processor day-night detection. An exemplary approach for a camera with an infrared light source involves determining a brightness value for image data based on an average luma value for the image data, determining white balance data for the first image data, and determining, based on the white balance data for the image data and white balance data for the infrared light source, a deviation value for the image data. A transition from night mode to day mode can be effected based on comparing the brightness value for the image data to a first threshold, and comparing the deviation value for the image data to a second threshold.

29 Claims, 14 Drawing Sheets

Fixed thresholds 502

Delta (radius) around IR LED:

$$\delta = \frac{\min_{i=1,\ldots,N}\left(\sqrt{(R_i/G_i - IR_{R/G})^2 + (B_i/G_i - IR_{B/G})^2}\right)}{2}$$

Day→Night transition threshold:

$$threshold_{night} = max(BV_{day} \mid lx)$$

Night→Day transition threshold:

$$threshold_{day} = max(BV_{night} \mid lx)$$

Example values:

$\delta = 0.15$
$threshold_{night} = 0.8$
$threshold_{day} = 6.25$

FIG. 5

Adaptive thresholds 650

Delta (radius) around IR LED:

$$\delta = \frac{\min_{i=1,\ldots,N}\left(\sqrt{(R_i/G_i - IR_{R/G})^2 + (B_i/G_i - IR_{B/G})^2}\right)}{2}$$

Day→Night transition threshold:

$$threshold_{night} = max(BV_{day} \mid lx)$$

Night→Day transition threshold:

$$\theta = arctan\left(\frac{R/G - IR_{R/G}}{B/G - IR_{B/G}}\right)$$

$$BV_{ratio} = a\theta^2 + b\theta + c$$

$$threshold_{day} = BV_{ratio} \cdot threshold_{night}$$

Example values:

$\delta = 0.15$ $threshold_{night} = 0.8$ $BV_{ratio} \in (3,8)$ $threshold_{day} \in (2.4, 6.4)$

FIG. 6D

IMAGE SIGNAL PROCESSOR DAY-NIGHT DETECTION

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. The photosensors included in image sensors typically detect light intensity with little or no wavelength specificity, preventing the sensors from separating color information in the captured light signal. White balancing may be implemented using an image signal processor (ISP) and is used to compensate for different color temperatures of light illuminating the scene so that the image colors appear more natural. In some examples, color correction is applied after white balancing in order to correct the color space (and/or to account for inaccuracies in white point estimation).

BRIEF DESCRIPTION OF DRAWINGS

FIG. 5 depicts an example of fixed threshold values that may be used by an image signal processor to transition between day mode and night mode, in accordance with various aspects of the present disclosure.

FIG. 6D depicts adaptive thresholds for transitioning a camera device between night mode and day mode based on the brightness value ratios determined for different illuminants in FIG. 6C, in accordance with various aspects of the present disclosure.

DETAILED DESCRIPTION

Figure 1:
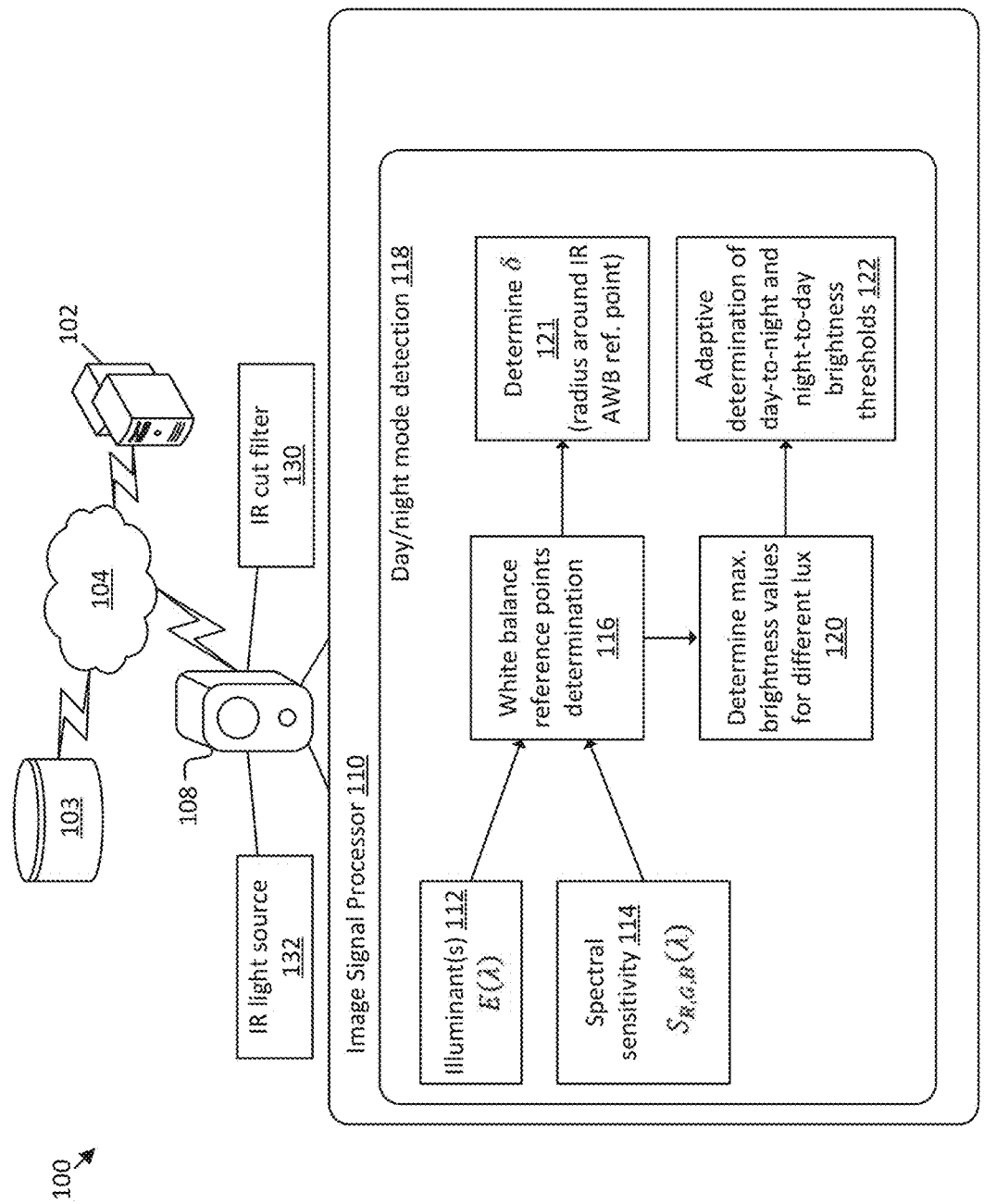
FIG. 1 is a block diagram of a system including a camera device with an image signal processor configured to implement image signal processor-based day-night detection, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In digital cameras, light is focused by one or more lenses (or other optical elements) onto an array of photosensors in an image sensor with each photosensor corresponding to a pixel. The photosensors convert the incoming light (photons) into electrical signals that can be stored, analyzed, and/or used to generate an image on a display. Different photosensors (e.g., those made by different manufacturers) exhibit different spectral sensitivities to different wavelengths of light. The photosensors of an image sensor are typically arranged in a grid (e.g., a two-dimensional pattern) with photosensors arranged in rows of aligned photosensors and columns of aligned photosensors. Each photosensor corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. Image sensors are solid state devices. Examples of different types of image sensors include charged couple device (CCD) sensors and complementary metal-oxide semiconductor (CMOS) sensors. In general, a frame of image data refers to any set of image data values that may be considered together for some purpose. For example, each photosensor/pixel of an image sensor may capture individual pixel information. The pixel information may be considered as a group when arranged into a frame of a two-dimensional grid. Each position in the grid may be referred to as a "pixel" and each pixel may be associated with a pixel value that represents the intensity of light captured by the photosensor that corresponds to the pixel. Accordingly, in some examples, a pixel may be represented as a two-dimensional coordinate.

Color filter arrays (CFAs), which are comprised of a mosaic of color filters, are placed over the pixel sensors of the image sensor to capture a mosaic of color information. However, in a typical CFA implementation, any given pixel has color information for only a single color (corresponding to the color filter associated with that pixel in the CFA). CFA interpolation techniques (sometimes referred to as "demosaicing") interpolate color information from surrounding pixels to determine a full color image from the incomplete color information output by the image sensor overlaid with the CFA. Demosaicing is typically performed by an image signal processor which may either be included in the digital camera device or may be located remotely.

As previously described, the photosensors detect light intensity but, without more, are unable to separate different the intensity information for different wavelengths of light. Accordingly, the photosensors are not able to generate color information from the received light. CFAs include color filters that only allow certain wavelengths of light to pass. A CFA includes a pattern of such color filters where each pixel of the photosensor array corresponds to a single color filter from the CFA. Accordingly, each photosensor receives light that corresponds to a particular color. CFA patterns have been developed to allow for interpolation from surrounding pixels in order to determine color information for all relevant "missing" color channels.

For example, a photosensor may be overlaid with a light filter in the CFA that allows light of wavelengths between approximately 625-740 nanometers (nm) to pass. The pixel corresponding to this photosensor may be referred to as a "red pixel" as this is the approximate wavelength range of red light. Similarly, a pixel associated with a photosensor that is overlaid with a light filter in the CFA that allows light of wavelengths between approximately 435-500 nm to pass may be referred to as a "blue pixel" and a pixel associated with a photosensor that is overlaid with a filter in the CFA that allows light of wavelengths between approximately 520-565 nm to pass may be referred to as a "green pixel." In some examples described herein, photosensors that are sensitive to light in the near infrared range (NIR) may be used. Accordingly, the CFA for such image sensors may include NIR (sometimes referred to herein as "IR") filters that allow light of wavelengths in the infrared range to pass (e.g., from approximately 780-1100 nm). A pixel associated with a photosensor that is overlaid with a filter in the CFA that allows light of wavelengths between approximately 780-1100 nm to pass may be referred to as an "IR pixel" or an "infrared pixel."

Demosaicing refers to an algorithm that may be implemented by an image signal processor that determines the "missing" values for each pixel based on nearby pixels in the frame (e.g., using interpolation). For example, demosaicing may be used to determine the red, blue, and infrared values for a given "green" pixel. After demosaicing, each pixel has a full complement of color values (e.g., red, green, blue, and IR if an infrared photosensor is used).

For example, a simple demosaicing algorithm may interpolate the color value of the pixels of the same color in the neighborhood. For example, once the image sensor chip has been exposed to an image, the value of each pixel can be read. A pixel with a green filter provides an exact measurement of the green component. The red and blue components for this pixel may be obtained from the neighbors. For example, for a green pixel, two red pixel neighbors can be interpolated to yield the red value, and two blue pixels can be interpolated to yield the blue value Other, more sophisticated demosaicing approaches may be used to account for changing colors, irregular gradients, abrupt changes in color or brightness (such as along sharp edges or visual transitions in the image), etc.

The human eye perceives color differently relative to image sensors. When a human sees a specific object under different light sources, the human visual system can adapt to different illumination changes to see a color (e.g., of a white wall) as a relatively constant color. This is sometimes referred to as "chromatic adaptation" where the optical centers in the brain adjust the intensity of cone cell responses from the eye. However, image sensors in digital cameras have a fixed spectral response. This means that for different illuminance on a scene (e.g., for different color temperature of the light source illuminating a scene), absent white-balancing, the color of the same white wall will appear to change as the illumination changes. White balancing is used to apply different gains for different color channels (e.g., red channel gains, green channel gains, blue channel gains, infrared channel gains (in some cases), etc.) so that colors appear constant (e.g., the color appearance of the same white wall) under changing light conditions.

As described above, without additional processing, image sensors cannot recognize color temperature and thus cannot automatically adjust the color. This can lead to color distortion. As such, without white balancing and color correction, if a digital camera captures an image of the white wall on a sunny afternoon and then again at sunset, the wall will have a different color in each image because the camera has not adopted the correct color temperature. White balance gains (and color correction matrix (CCM) values) may be determined using statistics gathered during calibration of the image sensor. Such calibration statistics may include auto-white balance statistics, auto-exposure statistics, and auto-focus statistics. Collectively, these statistics are often referred to as "3A statistics." The 3A statistics may be stored in memory and may be used to determine the white balance gains and/or the CCM.

Additionally, the human eye has a fixed spectral sensitivity, which is different from the spectral sensitivity of image sensors. The CCM is used to map the spectral sensitivities of the image sensor to those of the human eye so that the colors the same or similar to what is perceived with the human eye. CCM is applied after white-balancing and is illumination dependent so CCM is applied for changing lighting conditions and light sources.

Some photosensors are sensitive to light in the infrared (IR) portion of the spectrum. Some infrared sensitive image devices may operate in a day mode and a night mode and may switch between these two modes depending on the ambient light level. For example, during day mode operation an IR cut filter may be used to filter out infrared information from the light path such that infrared light is prevented from reaching the photosensors. In some examples, during night mode operation, the IR cut filter may be removed so that infrared light can reach the photosensor. Additionally, in many examples, an infrared light source (e.g., an infrared light emitting diode (LED) light source) may be turned on to provide illumination in dark settings. During night time and/or in other low-lighting settings, the IR information may allow the image sensor to receive enough light to generate to generate images in spite of the low amount of light in the visible spectrum. During daylight and/or capturing images in highly-illuminated settings, IR information may be removed as IR light may lead to color distortion. In some devices, a dedicated IR removal component (e.g., an IR cut filter or a software component used to subtract IR information during image processing) may be used.

In addition to changing a position of the IR cut filter and/or turning on/off the infrared light source, the automatic white balance gains and/or color correction matrices (CCMs) applied to each frame of image data may change depending on the current mode of the camera device (e.g., day mode or night mode) as described in further detail below. In many such IR-sensitive devices that can operate in day mode and night mode, a dedicated ambient light sensor is used to detect the ambient light level.

Depending on the current level of ambient light day mode or night mode may be selected for camera device operation. However, ambient light sensors may increase manufacturing cost and complexity. In addition, ambient light sensors may suffer from faulty readings when an illuminant is directed into the ambient light sensor, leading to improper transitions between day mode and/or night mode. Described herein are various systems and techniques that can be used to determine whether to switch from night mode to day mode and from day mode to night mode (or between any other such modes that are determined on the basis of light level on the scene). In various examples described herein, an image signal processor (ISP)-based night/day mode detection techniques are described. In some examples, automatic white balance statistics-which are continuously calculated to estimate the white point of the illuminant for the current scene—may be used to determine whether to switch between day and night modes. In various examples described herein, brightness thresholds are determined in an adaptive manner in order to prevent flicker. Flicker, in this context, refers to switching back and forth between day mode and night mode due to brightness thresholds being set too closely together. Since changing between day mode and night mode causes reconfiguration of the ISP—which can lead to several black frames of image data (frames captured while the ISP is being reconfigured) followed by several overexposed frames (frames captured while automatic white balance gains and CCMs are being calculated and/or are reaching a steady state)—flicker represents an undesirable event to be minimized. Adaptive brightness thresholds are determined for all illuminants based on a ratio of maximum brightness values determined for night mode to the maximum brightness values determined for day mode for a particular image sensor at a given level of lux.

FIG. 1 is a block diagram of a system 100 including a camera device 108 with an image signal processor 110, one or more computing devices 102, and one or more non-transitory computer-readable memories 103, arranged in accordance with various aspects of the present disclosure. In various examples, the one or more computing devices 102 may be configured in communication over a network 104. In some examples, day/night mode detection 118 may be implemented in image signal processor 110, which may be either implemented in a device (e.g., camera device 108) or which may be located remotely with respect to a camera device (e.g., in the one or more computing devices 102). For example, one or more of the techniques used by the Day/night mode detection 118 may be performed using an application specific integrated circuit (ASIC) and/or using a field programmable gate array (FPGA). Network 104 may be a communication network such as a local area network (LAN), a wide area network (such as the Internet), or some combination thereof. The one or more computing devices 102 and/or the camera device 108 may communicate with non-transitory computer-readable memory 103 (e.g., either locally or over network 104). The non-transitory computer-readable memories 103 may store instructions that may be effective to perform one or more of the various techniques described herein. Camera device 108 may include an infra-red light source (IR light source 132) that may be used to illuminate the scene with infrared light when the camera device 108 is in night mode. Conversely, when the camera device 108 transitions from night mode to day mode, the IR light source 132 may be switched off and an IR cut filter 130 may be interposed over the photosensor array to filter out any infrared light.

In various examples, an image sensor of the camera device 108 (not shown in FIG. 1) may capture an image (e.g., a frame of raw pixel data). The automatic white balance (AWB) is calculated for a given scene that is represented by pixel data (e.g., in a frame, slice, etc.). The illuminant(s) 112 (represented by E(λ)) are constant illuminant reference points (sometimes referred to as "standard illuminants"). The illuminants 112 represent a set of standardized spectral power distribution (SPD) data sets that represent real light sources. The spectral sensitivity 114 (represented by $S_{R,G,B}(\lambda)$) may be measured using a monochrometer for the particular image sensor (e.g., for the camera device 108) and may be a fixed value. In addition, the infrared light source (e.g., an IR LED associated with camera device 108) may have a known spectral power distribution that represents the transmittance of the infrared light source on the photosensors of the camera device 108. This may also be a fixed value for the particular IR light source.

The input illuminance E(λ) may be multiplied by the wave length of the spectral sensitivity 114 using:

$$E(\lambda) \times S_{R,G,B}(\lambda) = RGB(\lambda)$$

RGB(λ) may be integrated to determine the red, green, and blue channel values for the image:

$$R,G,B = \int E(\lambda) \cdot S_{R,G,B}(\lambda) d\lambda$$

A maximum brightness value BV max may be determined from among these R, G, and B values:

$$BV_{max} = \max(R,G,B)$$

Typically, the green channel value, G, represents the maximum value. The white balance gains for the current image may be determined per-color channel (at block 116) using:

$$WB_c = \frac{BV_{max}}{c} \text{ where } c \in \{R, G, B\}$$

There may be a set of white balance gains for each reference illuminant (as well as a CCM for each reference illuminant). For a given input image, the white balance gains (and CCM) may be determined by interpolating between the values for the nearest reference illuminants (see FIG. 2). In other words, the nearest illuminant types to the input image may be selected and the white balance gains may be interpolated from the reference illuminant types. The R, G, and B values for an input image may be determined using the histogram generated for the input image (e.g., by taking the average color channel values from a down-scaled version of the image, while ignoring saturated, overexposed values).

As described in further detail below, the white balance reference points (including an IR white balance reference point) may be used to determine a term δ (action 121) that may, in turn, be used to determine when to transition from night mode to day mode for the camera device 108. The term δ represents a radius around the IR light source reference point and may be used in day-night mode detection. Additionally, as described in further detail below, at action 120, the maximum brightness values may be determined for different levels of lux. These maximum brightness values may, in turn, be used at action 122 to adaptively determine day-to-night and night-to-day brightness thresholds that can be used to transition the camera device between night mode and day mode.

Figure 2:
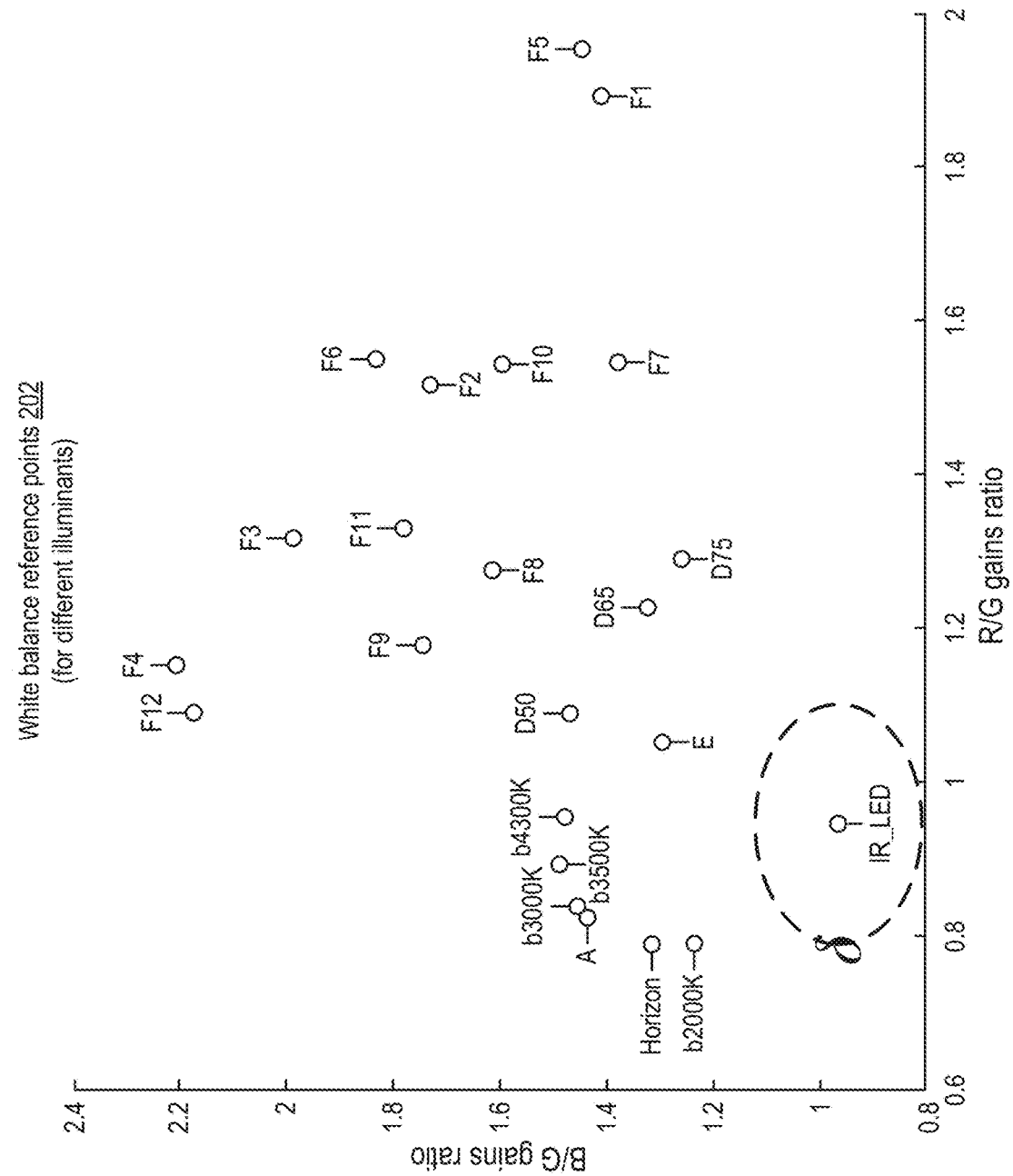
FIG. 2 is an example graph that may be used for automatic white balancing of images, in accordance with various aspects of the present disclosure.

FIG. 2 is an example graph that may be used for automatic white balancing of images, in accordance with various aspects of the present disclosure. The graph depicts white balance reference points 202 determined for different reference illuminants. The white balance points are determined based on ratios of gains for the different color channels (R/G gains ratio and B/G gains ratio). These gain ratios may be empirically determined for the reference illuminants from the 3A statistics for frames of image data illuminated using the relevant illuminants. Each of the reference points 202 may be associated with per-channel white balance gains $WB_c$ calculated as described above. In addition, a CCM may be determined for each of the reference points 202.

An auto-white balance ("AWB") component of the ISP may initially down-sample the input image data (e.g., to a 16×16 pixel frame, 64×64 pixel frame or some other suitable frame size). The down-sampling may be performed for each color channel separately. Accordingly, following the down-sampling there may be three 16×16 pixel frames (or some other suitable size) for an RGB sensor, one frame for each color channel. Additionally, a frame that denotes saturated pixel regions may be generated (often referred to as a "saturation map"). Accordingly, AWB statistics may be of 4×16×16 size (where 4=3 color channels (R, G, B)+1 saturation map). AWB uses the pixel statistics from non-saturated regions in the image to estimate the illuminant present in the scene. Illuminant can be identified using R/G and B/G channel ratios. Using these estimated ratios, the AWB algorithm finds the closest (e.g., the two or three closest) reference points from the image sensor calibration data. Interpolation may be used between the reference points to determine the AWB gains and the CCM for the current scene.

As shown in the graph in FIG. 2, the axes represent the R/G and B/G ratios. Each point in the graph represents a pair of white balance gains (e.g., a 1×3 vector with gains for each channel (R, G, B)) and a CCM matrix (e.g., a 3×3 matrix as described below in reference to FIG. 7 and color correction component 720). The final white balance gains to be used by white balance component 718 and CCM to be used by color correction component 720 may be determined by interpolating between the two or three closest reference points in the graph. Additionally, as described herein, the various AWB reference points 202 for different illuminants may be used to determine adaptive brightness thresholds for transitioning between day mode and night mode (and vice versa).

The IR light source reference point (e.g., IR_LED) in FIG. 2 represents the B/G gains ratio and the R/G gains ratio characteristic for the IR light source that is used by the relevant camera device 108 and its ISP. The term δ represents a radius around the IR light source reference point and may be used in day-night mode detection. For example, in order to transition night mode to day mode, the B/G gains ratio and the R/G gains ratio of the current scene may be at least a threshold distance from the IR light source (in the graph of FIG. 2). The threshold distance is defined by δ. This threshold may alternatively be characterized as a threshold deviation, threshold dissimilarity, threshold delta, etc.

This threshold distance is utilized to ensure that light on the current scene is not predominantly due to the infrared light source (which would indicate that night mode should be maintained). Additionally, AWB reference points (including for the IR light source) may vary from sample to sample creating more of a point spread in the B/G vs. R/G gains ratio space (as opposed to a single point). The radius δ may be selected so as to be large enough to accommodate for this variance and so as to be sufficiently dissimilar from other non-IR AWB reference points. The radius δ may be calculated as follows:

$$\delta = \frac{\min_{i=1,\ldots N}\left(\sqrt{(R_i/G_i - IR_{R_i/G_i})^2 + (B_i/G_i - IR_{B/G})^2}\right)}{2}$$

where i is the index of the reference illuminant, $IR_{R/G,B/G}$ is the reference point for IR LED (or other IR light source), and $R_i/G_i$, $B_i/G_i$ is the reference AWB gains ratio of the different reference illuminants. The expression for δ represents the minimum distance in the graph of FIG. 2 between another reference point and the IR reference point divided by two. It should be noted that the divisor "2" may be replaced by another divisor, in accordance with the desired implementation and/or sensitivity.

Figure 3:
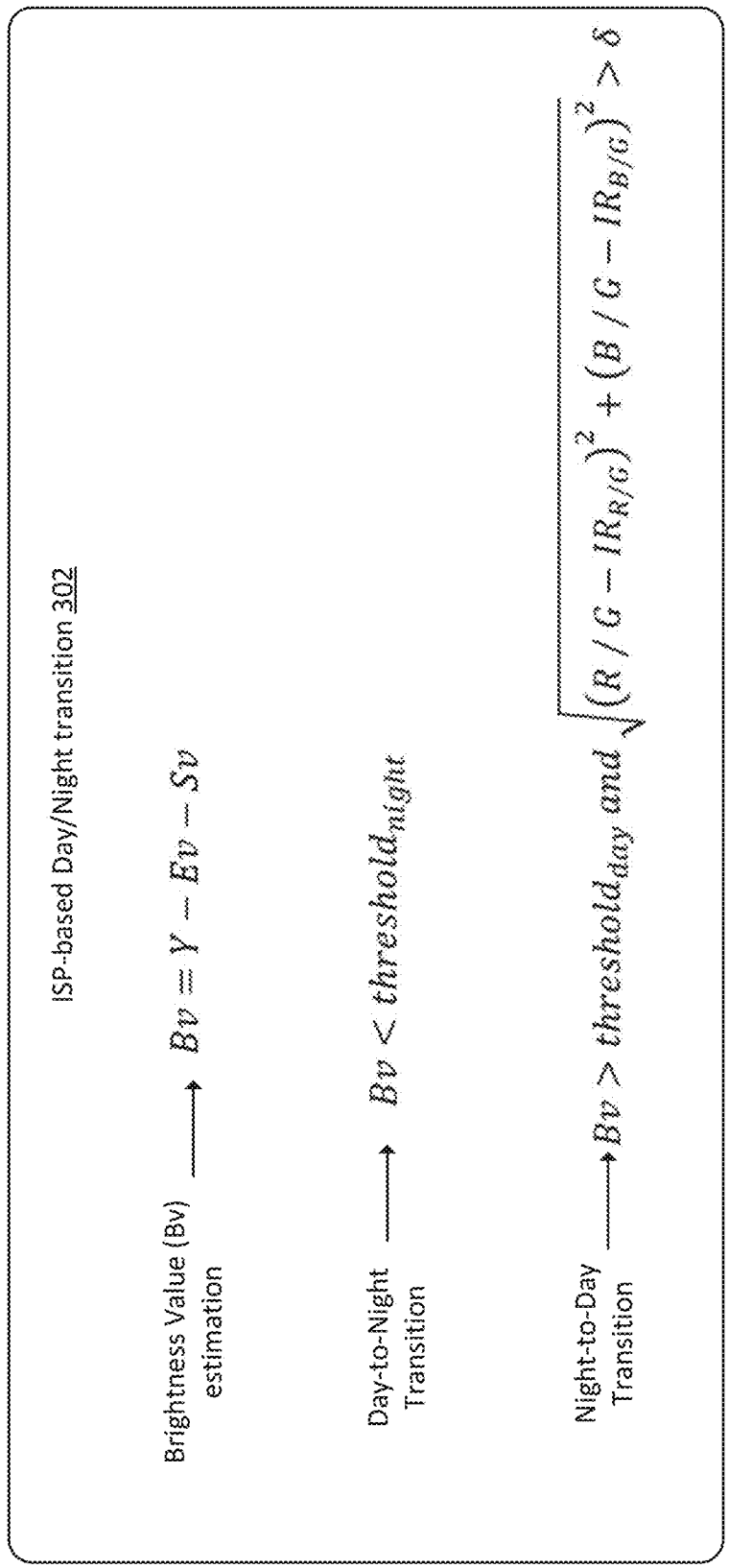
FIG. 3 depicts example thresholds that may be used to determine when to switch a camera device between day mode and night mode, in accordance with various aspects described herein.

FIG. 3 depicts example thresholds that may be used to determine when to switch a camera device between day mode and night mode, in accordance with various aspects described herein. ISP day/night transition 302 may include estimating a brightness value Bv for the current scene. Brightness value estimation of the current scene may be determined using:

$$Bv = Y - Ev - Sv$$

in logarithm scale, where Bv is the estimated brightness value of the scene (e.g., the current frame of image data captured by the photosensors of the camera device at a particular time). Y represents the average pixel luma value of the scene and may be determined from the 3A statistics calculated for each captured frame of image data for auto-exposure (AE) of the camera device. After the auto-exposure process has converged the brightness value may be estimated. Ev represents the exposure time of the current frame (e.g., the amount of time the photosensors are exposed to light to form the current frame of image data). Sv represents the International Organization for Standardization (ISO) speed value (e.g., the analogue gain). ISO speed indicates the sensitivity of the photosensors to light. A higher ISO speed indicates higher sensitivity to light and a lower ISO speed indicates lower sensitivity to light.

AE increases the gain and integration time of the image as the lux level decreases. The brightness value Bv of an image may be estimated by "undoing" AE by subtracting Ev and Sv from the average pixel luma value Y.

The estimated brightness value Bv may be determined for each frame (and/or at some other desired cadence) to determine whether the camera device 108 should be transitioned to a different mode (e.g., among day mode and night mode and/or among one or more other predefined modes).

For example, as shown in the ISP-based day/night transition 302 in FIG. 3, if the camera device is currently in day mode and the estimated Bv is less than $threshold_{night}$ the camera device 108 may switch from day mode to night mode (e.g., by removing the IR cut filter from the light path to the photosensor and by turning on the IR light source). For example, the camera device 108 may switch from day mode to night mode when the following expression is satisfied:

$$Bv < threshold_{night}$$

Conversely, if the camera device 108 is currently in night mode and the estimated Bv is greater than (or equal to) $threshold_{day}$ and the distance for the R/G and B/G channel gains for the image data is greater than δ the camera device 108 may switch from night mode to day mode. For example, the camera device 108 may switch from night mode to day mode when the following expressions are satisfied:

$$Bv > threshold_{day} \text{ and } \sqrt{(R/G - IR_{R/G})^2 + (B/G - IR_{B/G})^2} > \delta$$

Additionally or alternatively to being characterized as a distance, a calculated value may be characterized as a deviation value, dissimilarity value, delta value, etc., and may be calculated using another formula for determining deviation, dissimilarity, or delta as compared to an infrared light source.

In accordance with one or more preferred implementations, thresholds are set at appropriate values and in such a way as to minimize flicker. One approach may be to set the threshold$_{night}$ and threshold$_{day}$ values relatively far apart. However, this can lead to switching from night to day at a relatively late stage (e.g., at a relatively high level of light). This can lead to a poor user experience, as color correction may be more difficult and/or less accurate when the IR cut filter is removed and infrared light is captured by the image sensor. Accordingly, color reproduction may appear to be of lower quality if the threshold$_{day}$ is simply set at a high level that is far apart from threshold$_{night}$ even though flicker may be avoided. Described below are techniques for adaptively determining the appropriate brightness thresholds threshold$_{night}$ and threshold$_{day}$ based on the particular illumination characteristics on the scene.

Figure 4A:
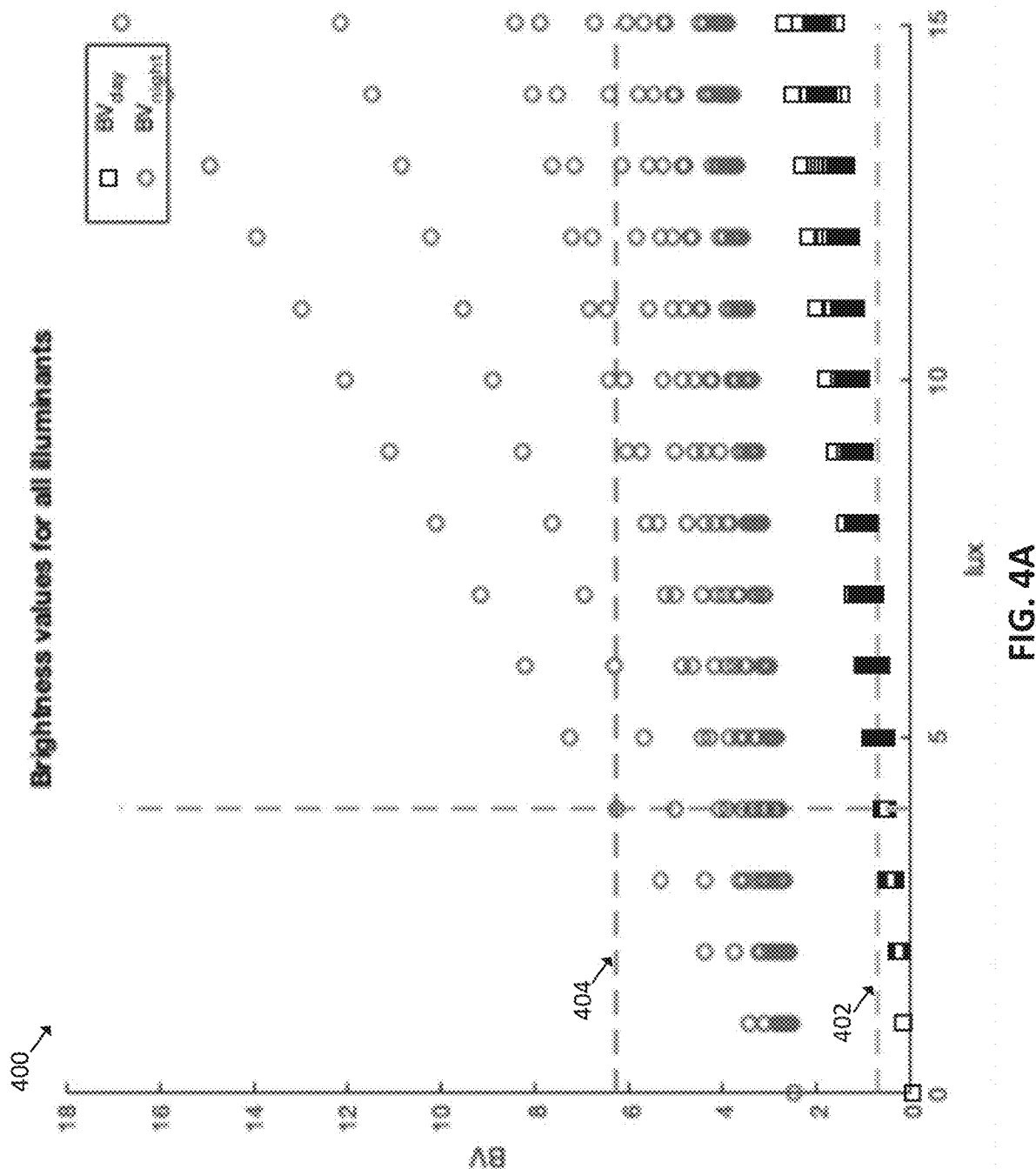
FIG. 4A depicts a graph brightness values for different illuminants at different levels of lux, in accordance with various examples described herein.

FIG. 4A depicts a graph 400 showing brightness values for different illuminants at different levels of lux, in accordance with various examples described herein. The graph 400 depicts brightness values for reference illuminants (e.g., the reference illuminants represented by the reference points 202 in FIG. 2). At a given level of lux, the brightness values Bv of the different illuminants are shown while in day mode and in night mode. In other words, each circle at a given lux value represents a different illuminant either in day mode (with IR cut filter engaged and IR light source off) or in night mode (with IR cut filter removed and IR light source on). As shown, the brightness values in night mode have higher Bv values due to higher sensitivity, the fact that the IR cut filter is removed, and due to the infrared light illumination.

Figure 4B:
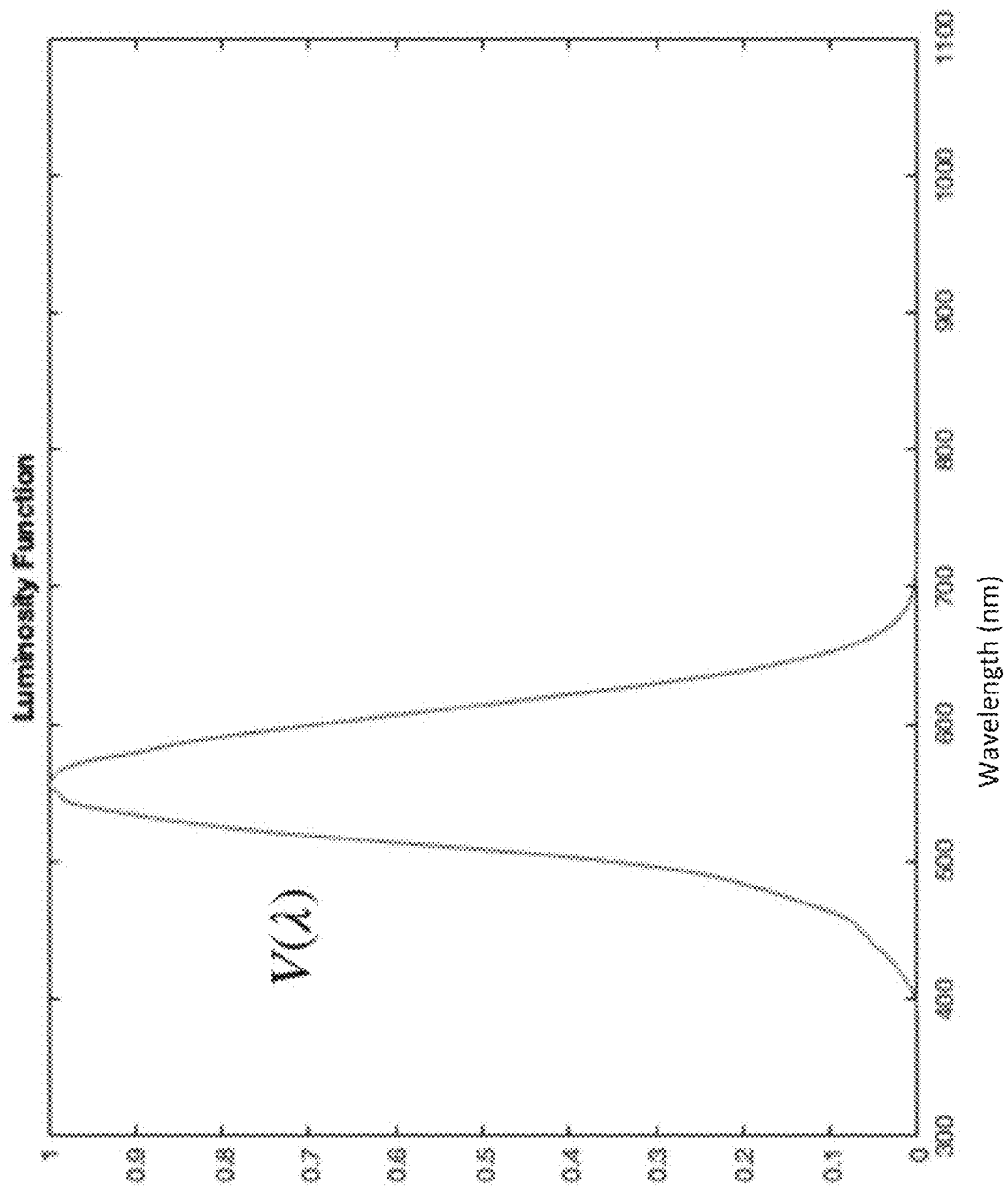
FIG. 4B depicts the luminosity function that may be used to determine lux values of FIG. 4A, in accordance with various aspects of the present disclosure.

Lux is the luminous flux (e.g., in lumens) and is given by:

$$\phi_v = 683.002 \cdot \int_{380}^{780} V(\lambda) \cdot E(\lambda) d\lambda [lm]$$

where $V(\lambda)$ is the luminosity function (shown in FIG. 4B) and $E(\lambda)$ is the spectral radiant flux in W/nm. The illuminance (in lux (lx)) is given by:

$$E_v = \frac{\phi_v}{s} [lx]$$

where $\phi_v$ is luminous flux, in lumens, S is area in m$^2$ (e.g., of aperture).

$$1 \; lx = 1 \; lm/m^2 = 1 \; cd \cdot sr/m^2$$

Luminoux flux is the light emitted by a source and illuminance is the light received by an object. Ambient light sensors typically use lux values to determine when to switch between day mode and night mode.

Returning to FIG. 4A, one way to select the threshold$_{day}$ and threshold$_{night}$ values is to select, for a given lux value, the maximum brightness value for the illuminant. In the example shown in FIG. 4A, at 4 lux, threshold 404 may be used as threshold$_{day}$ and threshold 402 may be used as threshold$_{night}$.

Accordingly, as shown in FIG. 5, the threshold$_{day}$ may be determined as:

threshold$_{day}$=max($BV_{night}$|lx)

and the threshold$_{night}$ may be determined as:

threshold$_{night}$=max($BV_{day}$|lx).

The radius around the infrared light source, $\delta$, may be determined as:

$$\delta = \frac{\min_{i=1,\ldots N}\left(\sqrt{(R_i/G_i - IR_{R_i/G_i})^2 + (B_i/G_i - IR_{B_i/G})^2}\right)}{2}$$

as previously described.

However, in some cases (e.g., at certain lux values), the threshold$_{night}$ and the threshold$_{day}$ may be relatively close to one another, which may result in flicker between day mode and night mode. Additionally, as described above, another approach may be to set the threshold$_{night}$ and threshold$_{day}$ values relatively far apart. However, this can lead to switching from night to day at a relatively late stage (e.g., at a relatively high level of light). This can lead to a poor color correction and unnatural/incorrect colors due to the IR cut filter being removed and infrared light being captured by the image sensor. Accordingly, color reproduction may appear to be of lower quality if the threshold$_{day}$ is simply set at a high level that is far apart from threshold$_{night}$ even though flicker may be avoided. Accordingly, described herein are adaptive threshold techniques that may be used to calculate per-illuminant sets of thresholds (threshold$_{night}$ and threshold$_{day}$).

Figure 6A:
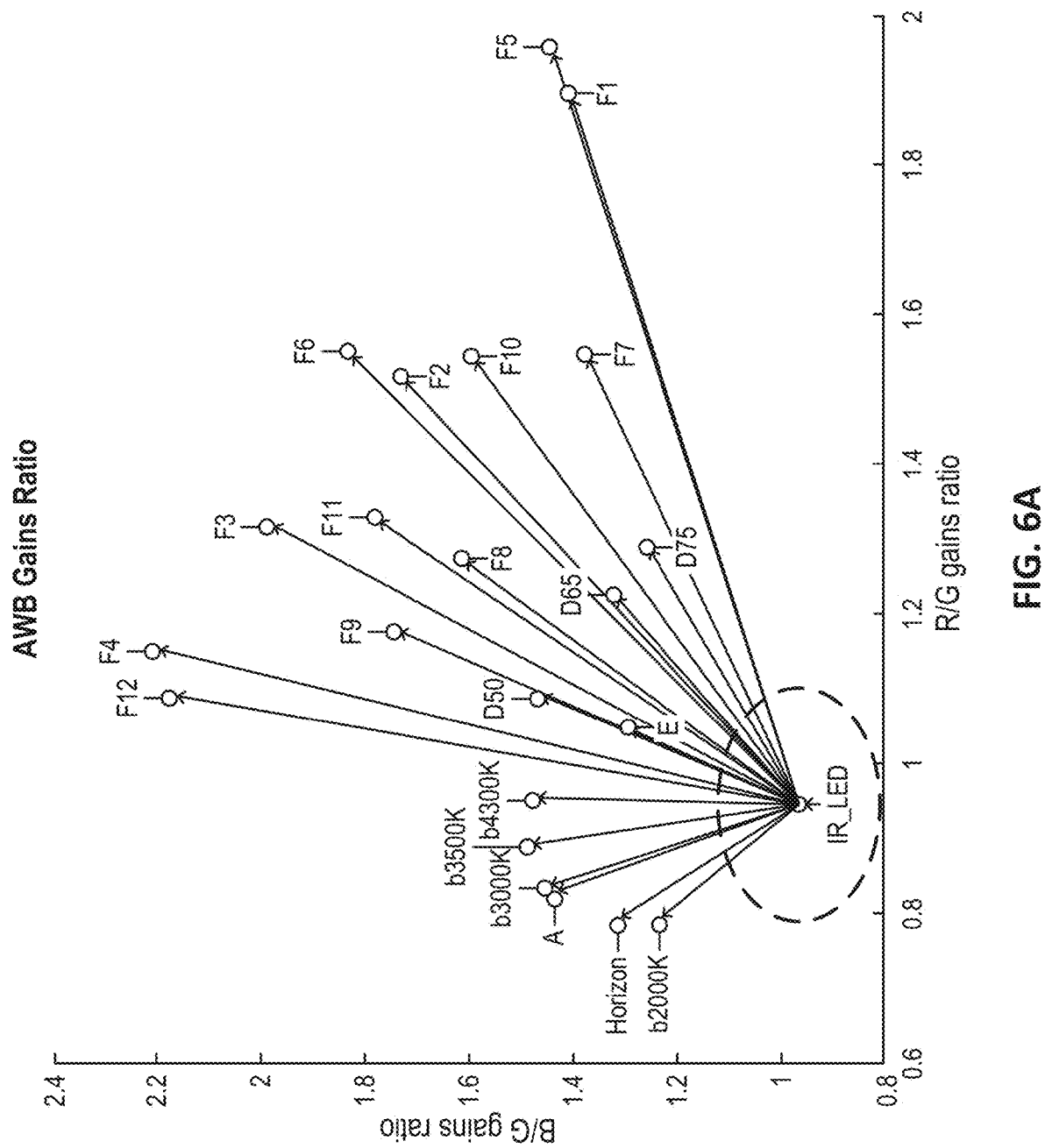
FIG. 6A is an example determination of an angle between an IR light source reference point and various other illuminant reference points that may be used in accordance with various techniques described herein.

FIG. 6A is an example determination of an angle between an IR light source reference point and various other illuminant reference points that may be used in accordance with various techniques described herein. For example, the angle $\theta$ between the IR light source reference point and each of the other illuminant reference points may be determined.

The angle may be determined for each reference illuminant as:

$$\theta_i = \arctan\left(\frac{R_i/G_i - IR_{R/G}}{B_i/G_i - IR_{B/G}}\right).$$

Figure 6B:
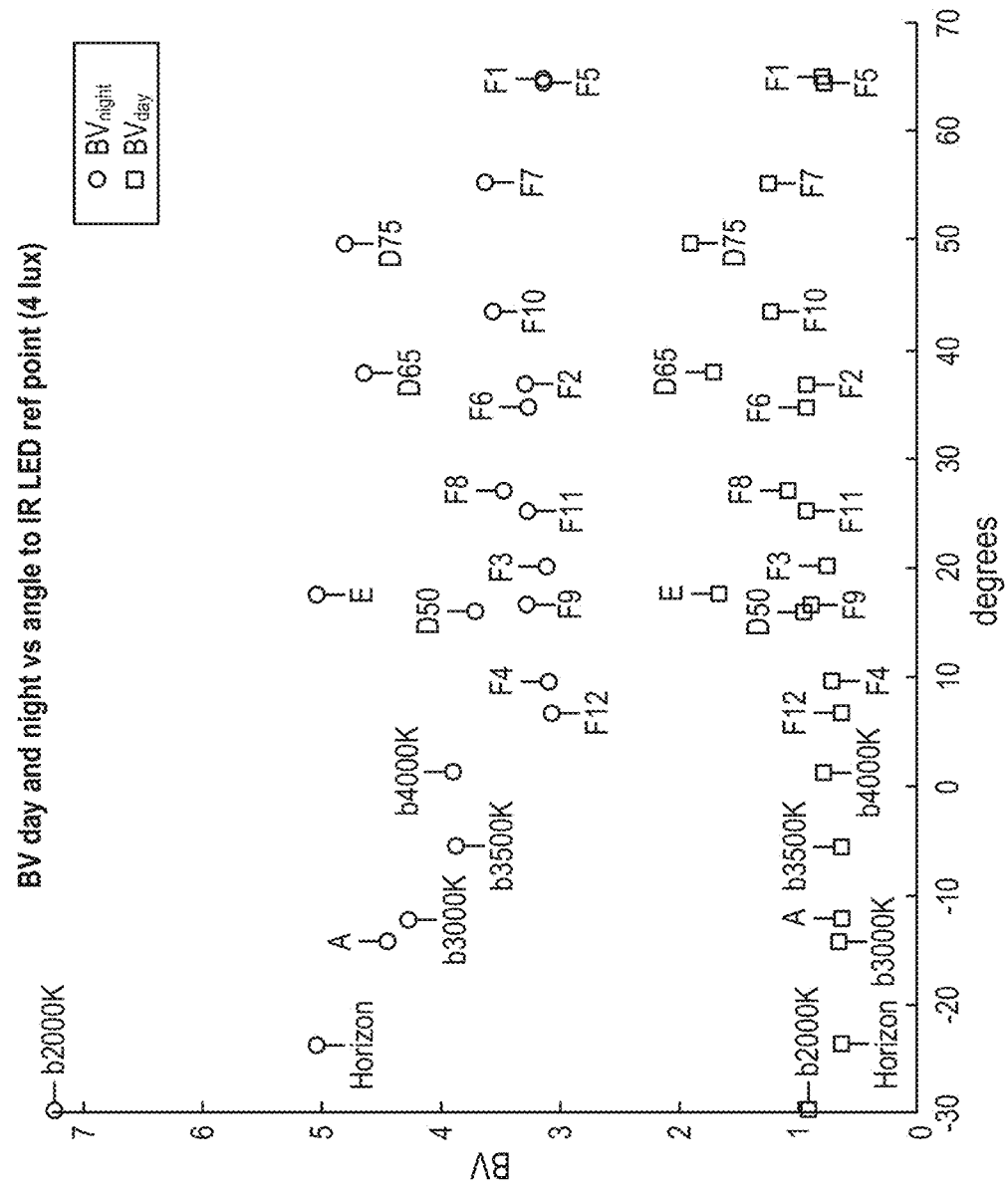
FIG. 6B depicts a graph of brightness values for day mode and night mode for different illuminants plotted vs. the angle determined in FIG. 6A, in accordance with various aspects of the present disclosure.
Figure 6C:
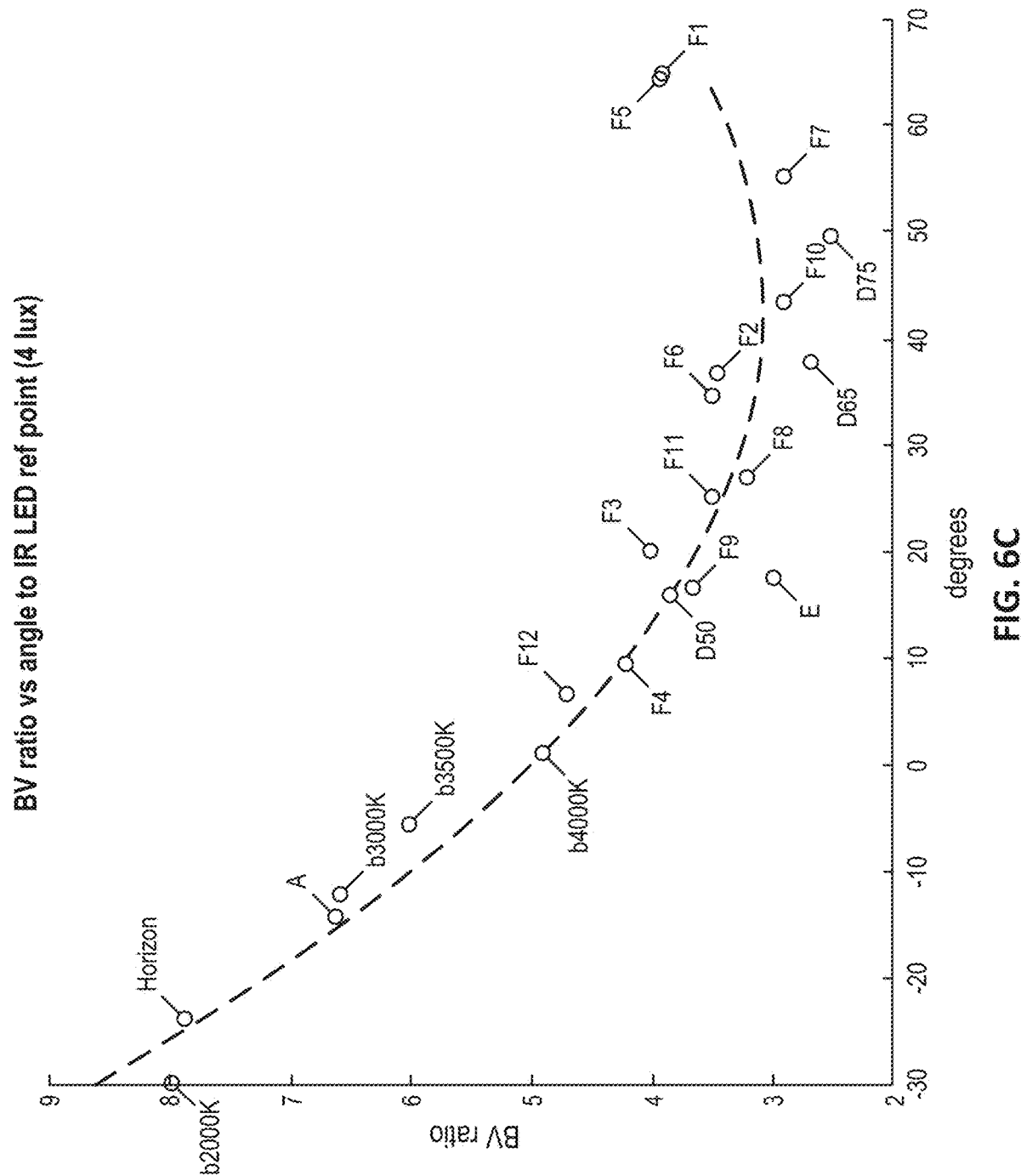
FIG. 6C depicts a brightness value ratio of night mode to day mode vs. the angle determined in FIG. 6A, in accordance with various aspects of the present disclosure.

This may be used to separate the brightness values for the different reference illuminants, by plotting brightness values Bv vs. the angles $\theta$ as shown in FIG. 6B. FIG. 6C depicts a plot of brightness value ratio (Bv$_{ratio}$—the ratio of night mode Bv to day mode Bv) vs. the angle determined in FIG. 6A, in accordance with various aspects of the present disclosure. These By ratios can then be used to adaptively determine thresholds for a given frame of image data captured by the image sensor.

FIG. 6D depicts adaptive thresholds 650 for transitioning a camera device between night mode and day mode based on the brightness value ratios determined for different illuminants in FIG. 6C, in accordance with various aspects of the present disclosure. As shown, the threshold$_{night}$ and $\delta$ may be determined as described above in reference to FIG. 5. However, the threshold$_{day}$ may be determined using the Bv$_{ratio}$. For example, the R, G, B values of the current frame of image data may be determined (e.g., as described above in reference to FIG. 1). The angle $\theta$ between the R/G vs. B/G ratios and the reference IR light source may be determined for the current frame using the expression shown in FIG. 6D. The angle $\theta$ may then be used to lookup the Bv$_{ratio}$ for the current frame. Although the example in FIG. 6D depicts an implementation in which a quadratic function is fit to the brightness value ratios (e.g., as shown in FIG. 6C), the Bv$_{ratio}$ lookup may be implemented on the ISP as a piecewise linear function for simplicity. The adaptive thresholds may be calculated for every frame captured by the image sensor as the 3A statistics already provide the RGB values for each frame.

The $Bv_{ratio}$ may be multiplied by the $threshold_{night}$ to determine an adaptive $threshold_{day}$ that is adaptively determined for the particular illuminant(s) that have been determined for the current scene (based on similarity to reference illuminant(s)). In various examples, the thresholds $threshold_{day}$, $threshold_{night}$, and δ may be stored in a lookup table and may be looked up based on the R G and B G gain ratios and the angle θ for the current scene. Accordingly, the current brightness value Bv may be estimated and the adaptively-determined thresholds may be evaluated as described above in reference to FIG. 3 in order to determine whether to transition the camera device between day mode and night mode (or vice versa).

Figure 7:
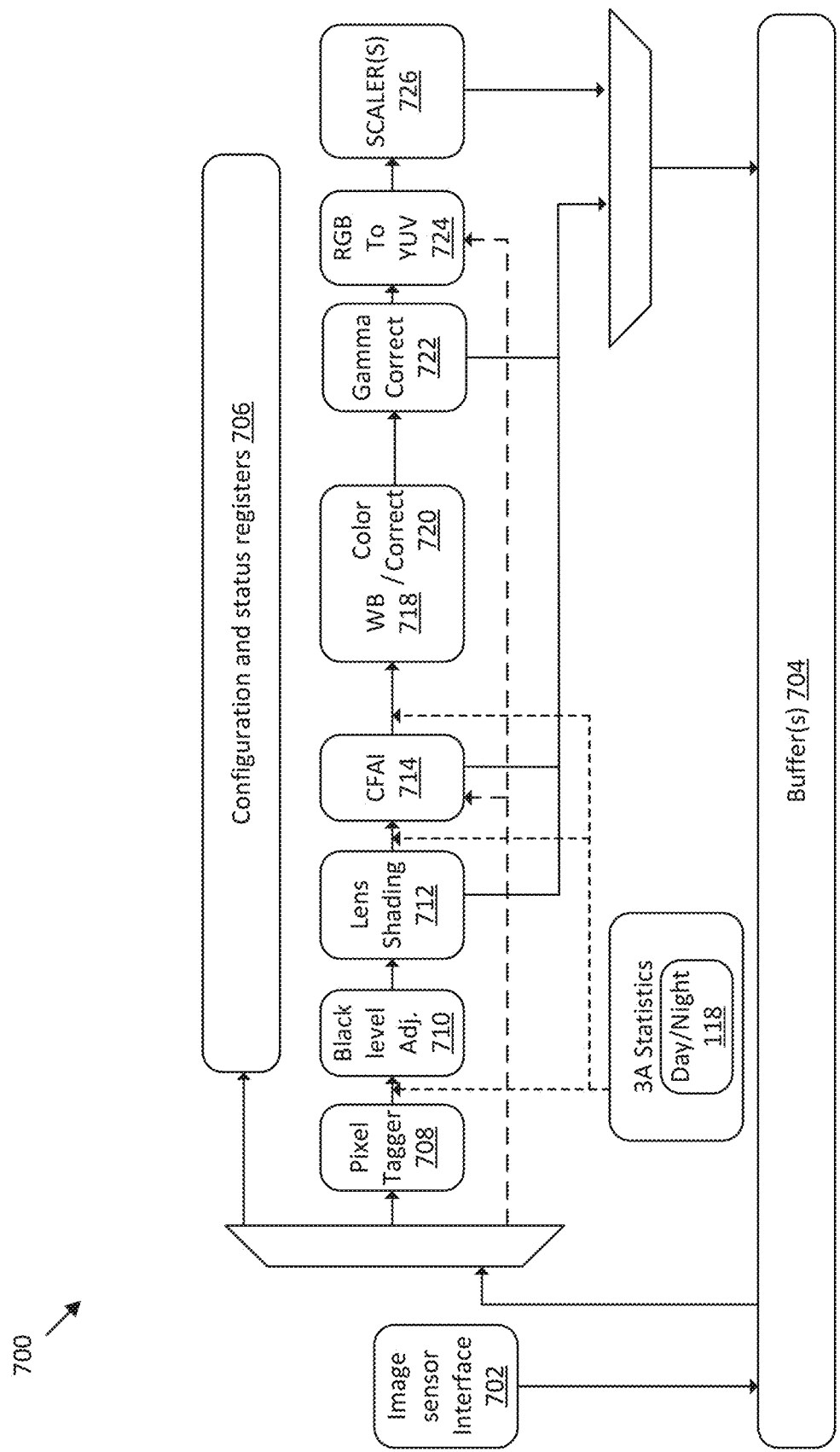
FIG. 7 is a block diagram of an example image signal processor (ISP) architecture that may be used in accordance with various aspects of the present disclosure.

FIG. 7 is a block diagram of an example image signal processor architecture 700 that may be used in accordance with various aspects of the present disclosure. In some examples, an image signal processor may be implemented with a different architecture relative to the example image signal processor architecture 700 displayed in FIG. 7. For example, certain components may be omitted, additional components may be added, and/or some components may be substituted for other, different components, depending on the desired implementation.

The image signal processor architecture 700 (e.g., an image signal processor (ISP)) may include an image sensor interface 702 that receives image data from the image sensor (e.g., as filtered using the CFA). For example, the image sensor interface 702 may be a mobile industry processor interface ("MIPI") such as MIPI D-PHY or MIPI C-PHY. MIPI D-PHY is a physical layer that includes a clock-forwarded synchronous link providing low noise and high jitter tolerance. MIPI D-PHY uses one clock lane and a variable number of data lanes to receive the image data from the image sensor. MIPI C-PHY, by contrast, uses an embedded clock that is embedded into the data lane. In various examples, the image sensor interface 702 may bridge a MIPI controller interface data to a streaming interface (e.g., an AXI streamlining interface) that writes data to AXI memory.

Buffer(s) 704 may comprise one or more circular buffers that may be used for streamlining to/from AXI (or other streaming protocols). In various examples, inbound data streams may be managed by circular buffer readers and outbound data streams may be managed by circular buffer writers. The buffer(s) 704 may use circular buffer management addresses/pointers to map an AXI stream either to or from linear AXI memory. This streamlining to/from circular buffers provides data storage/capture/replay capability in static random access memory (SRAM).

Configuration and status registers 706 may store various configuration data such as, for example, CFA index values, pixel color values associated with different CFA index values (e.g., in a table), per-CFA index offset values, gain values for reference illuminants, the various thresholds described above, CCM values, etc. As described below, various components of the image signal processor architecture 700 may reference configuration and/or status data stored by configuration and status registers 706 during operation.

Image data may be received via image sensor interface 702 as an inbound pixel stream (IPS) comprising raw pixel values generated by the image sensor. Pixel tagger 708 may include circuitry (e.g., an ASIC) that tags the IPS data with metadata representing a coordinate (e.g., an X, Y coordinate) corresponding to the location of the pixel on the image sensor and/or the corresponding frame of image data. In addition, the pixel tagger 708 may tag the pixel with metadata representing an index position of the CFA. The X, Y coordinates may be used to lookup the pixel color (e.g., to represent the pixel as a red, green, blue, or infrared pixel based on the type of filter found at the index of the CFA). In some cases, metadata representing the pixel color (red, green, blue, or IR) may also be used by pixel tagger 708 to tag the inbound IPS data.

For example, pixel tagger 708 may use the frame width (in terms of a number of pixels) and height (in terms of a number of pixels) to tag the incoming raw pixel value (IPS data) with an X-Y position within the frame. The X, Y coordinates may be used to lookup a pixel color in a 16 entry table (e.g., corresponding to the color filters of the CFA) to label each pixel value with pixel color metadata. Similarly, each pixel value may be labeled with a CFA index (e.g., 0-15) that corresponds to the pixel value.

After tagging the pixel values using the pixel tagger 708 (as described above), the pixel values may be provided to black level adjustment component 710. Black level adjustment component 710 may include circuitry (e.g., an ASIC) effective to subtract a fixed direct current (DC) offset value from the input pixel values to adjust the black level of the image data. The particular DC offset value may be specific to each CFA index. Accordingly, the CFA index value metadata generated by pixel tagger 708 may be used by black level adjustment component 710 to determine the appropriate DC offset value to subtract for each pixel.

In various examples, the image signal processor architecture 700 may include a lens compensation component (not shown). A lens compensation component may be used to add a signed per-CFA index offset to compensate for veiling glare resulting from a lens of the camera generating the image data. Further, in some examples, a lens compensation component may apply a common multiplier (uniform gain) to all pixels to boost the signal. Further, in some examples, the lens compensation component (and/or a separate component) may perform defective pixel correction (DPC). DPC may evaluate each pixel's raw pixel value against an expected range of pixel values that is estimated using nearby pixels (e.g., adjacent pixels and/or pixels within a predefined distance from the subject pixel). If the pixel's raw pixel value is out of range the pixel may be deemed "defective" and the raw pixel value may be replaced by a pixel value that is estimated using nearby pixels of the same pixel color.

The pixel data may be sent to the lens shading component 712. In some examples, the lens shading component 712 may be combined with a lens compensation component. However, in other implementations, these components may be implemented using separate circuits and/or modules. Lens shading component 712 may compensate for lens and camera defects and/or tolerances, as well as lens edge transmission characteristics by applying a per-pixel color gain based on the X, Y position of the pixel in the frame. In various examples, the lens shading component 712 may lookup the per-pixel color gain using the X, Y position metadata of the pixel (added by pixel tagger 708) in a table stored in configuration and status registers 706. In various examples, the per-pixel color gain may also be determined using the metadata indicating the pixel's color. The gain may be multiplicatively applied to the pixel using a multiplier circuit of the lens shading component 712 in order to account for lens properties and manufacturing tolerances. In various implementations, the per-pixel color gain may be determined using the pixel's X, Y position metadata to identify a lens-shading cell of a grid. The corners of the cell may define the four corner grid points. Each corner grid point may be associated with a respective lens shading gain for the pixel's pixel color. The four lens shading gains may be interpolated to determine the gain to be applied to the pixel.

After lens shading component 712, the modified pixel data (e.g., the modified raw pixel values and the various metadata tagging each pixel described above) may be sent to CFA interpolation (CFAI) component 714. CFAI component 714 may perform CFA interpolation (demosaicing) to generate $I_{R,G,B}$ image data for the current frame of image data so that each pixel is associated with a red pixel value, a green pixel value, and a blue pixel value (in the case of an RGB image sensor) or with a red pixel value, a green pixel value, a blue pixel value, and an infrared pixel value (in the case of an RGB-IR image sensor).

As shown in FIG. 7, white balance component 718 and color correction component 720 may be implemented as a single component in hardware (e.g., as a single integrated circuit). White balance component 718 may apply a per-CFA index multiplier (e.g., determined using a lookup table for each CFA index) as a gain to each pixel value. In various examples, white balancing and/or gamma correction (e.g., performed by gamma correction component 722) may be implemented by the same component (e.g., ASIC) as the color correction component 720. As previously described, red, green, and blue pixel values may be modified using a 3×3 color correction matrix of color correction component 720.

In some cases, visible light pixels (R, G, B pixels) may be saturated when IR pixels are not saturated. In such a case, subtraction of an unsaturated IR value from a saturated R, G, B pixel may result in overcompensation which produces some unnatural results (e.g., dark skies and/or black suns in outdoor images). Accordingly, in various examples, the optional IR removal component may perform a 3×3 matrix multiplication on R, G, B color pixels if such pixels are unsaturated. If pixels (and particularly green pixels which have higher and broader spectral response) are saturated, the IR component may be corrected using a secondary clip operation. Optimal clip values may be determined using statistics gathered from prior frames by analyzing regions of green pixels that are saturated.

Color correction component 720 may be a circuit (e.g., a color correction circuit) effective to apply a color correction matrix (CCM) to the color planes to correct the color space. For example, if IR is first removed (e.g., using an IR cut filter) the CCM may be:

$$\text{Pixel}[R\ B\ G] = \begin{bmatrix} KR_R & KB_B & KG_G \\ KB_R & KB_B & KB_G \\ KG_R & KG_B & KG_G \end{bmatrix} \cdot \begin{bmatrix} R \\ B \\ G \end{bmatrix}$$

The CCM and white balance gains may be determined using statistics related to calibration of the image sensor. Such calibration statistics may include Auto-white balance statistics, auto-exposure statistics, and auto-focus statistics. Collectively, these statistics are often referred to as "3A statistics." The 3A statistics may be stored in memory (e.g., in configuration and status registers 706) and may be used to determine the white balance gains and/or the CCM are described above (e.g., in reference to FIG. 2). Accordingly, the 3A statistics may be provided at various points in the image signal processing pipeline prior to WB component 718 and color correction component 720. Additionally, the 3A statistics may be used to estimate the brightness value of the current scene and to adaptively determine day and night brightness thresholds as described above. Accordingly, day/night mode detection component 118 is shown in FIG. 7 as a component of the 3A statistics block.

Gamma correction component 722 is used to correct for the differences between the way the image sensor captures information and the way that the human visual system processes light. In the image signal processor architecture 700 gamma correction may be performed using a lookup for each channel (e.g., R, G, and B) of each pixel to adjust the contrast of the image. Each color (R, G, B) may be associated with an independent gamma table that is used to lookup a gamma corrected value. In various examples, the lookup tables may be indexed by the pixel color value. The lookup tables may store the gamma corrected pixel values.

RGB to YUV component 724 may transform the RGB format data to the YUV format. In various examples, RGB to YUV component 724 may employ a 3×3 matrix multiplication followed by addition of an offset. For example:

$$Y = [R\ G\ B]\begin{bmatrix} Y_R \\ Y_G \\ Y_B \end{bmatrix} + Y_{offset};$$

$$U = [R\ G\ B]\begin{bmatrix} U_R \\ U_G \\ U_B \end{bmatrix} + U_{offset};$$

$$V = [R\ G\ B]\begin{bmatrix} V_R \\ V_G \\ V_B \end{bmatrix} + V_{offset}.$$

In various examples, the YUV format may require less bandwidth for transmission and/or storage.

Scaler 726 may be used to upscale or downscale the YUV (or RGB) data prior to converting the image data into a bit stream for writing to buffer(s) 704 (e.g., a circular buffer). In various examples, each of the luma (Y) and chroma (UV) channels may have separate configurations, to allow them to each be scaled independently. This may be important when converting from YUV444 to YUV420, as chroma is scaled to be ¼ the resolution (½ in each of the X, Y directions) of luma. Scaler 726 also provides cropping functionality such that the field of the output frame is a subset of the field of the input frame.

The scaler 726 first comprises a decimator followed by a filter. The decimator can be used to reduce the image size by 4:1, 3:1, 2:1, leave the image size unchanged, and/or change the image size by some other ratio, depending on the implementation. The image size may be changed independently in each of the horizontal (H) and vertical (V) directions.

In some examples, the decimator can be programmed to drop input pixels at the left, right, top, and bottom edges of the input image, providing for some cropping capability. Further cropping capability may be provided by the scaling function, with the added benefit of possibly more desirable edge interpolation, as the post-decimation image would not need to be edge extrapolated.

After the decimator stage, the input pixels define an annotated grid of locations, with columns (COLS) and rows (ROWS) (where COLS and ROWS is the post-decimator frame size). The scaler 726 uses the calibrated input grid and a set of configuration registers that are used to determine from where in the calibrated input grid each output pixel should be interpolated/extrapolated. The input pixels are defined to exist in the middle of each cell in the grid, thus the first input pixel is at 0.5, 0.5 in the defined grid.

Figure 8:
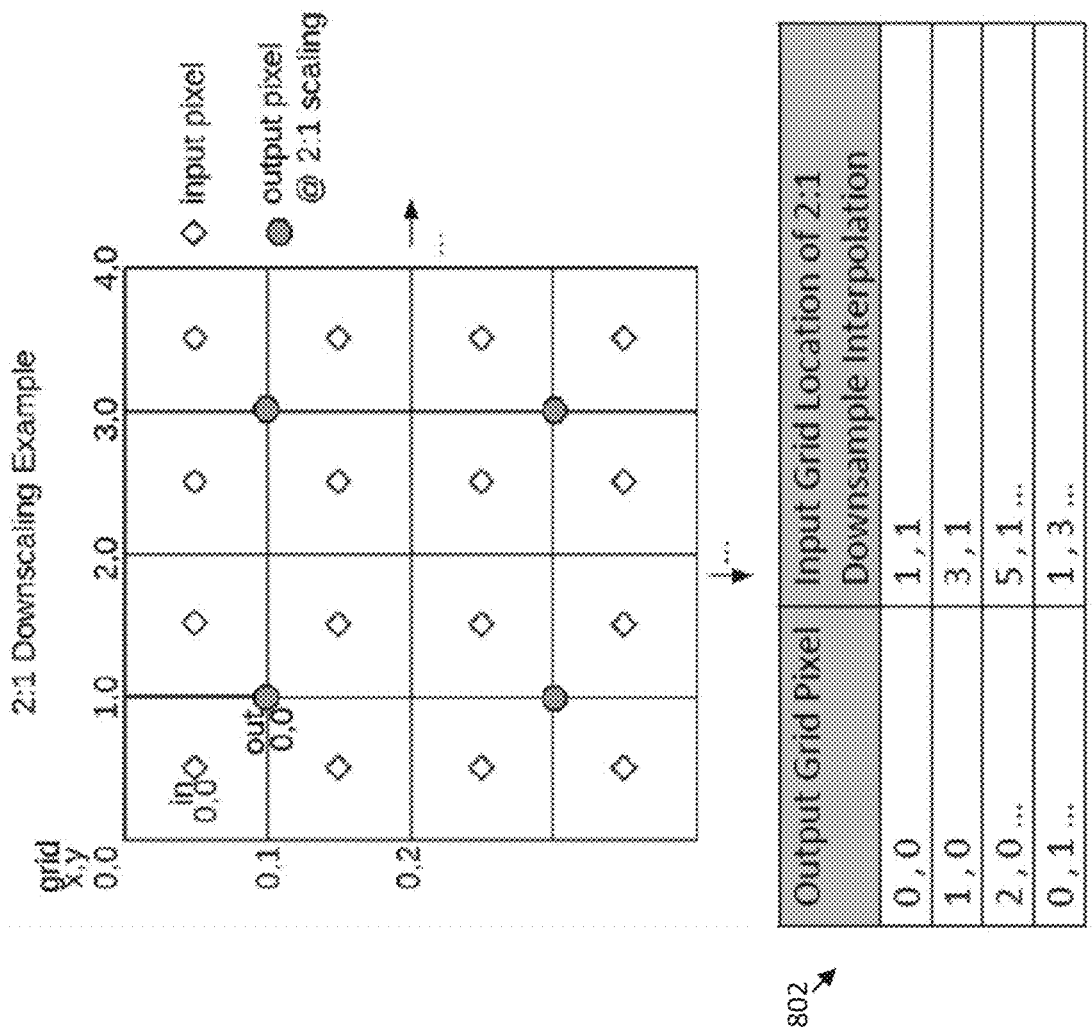
FIG. 8 is an example of image downscaling that may be performed in accordance with various aspects of the present disclosure.

FIG. 8 is a 2:1 example of image downscaling that may be performed in accordance with various aspects of the present disclosure. For example, to downscale from 640× 480 to 320×240 is a 2:1 downscale, and the input grid is 640 COLS and 480 ROWS of grid cells, but the grid points are 0,0 to 641,481. The output pixel at 0,0 of the output grid is interpolated from location 0.5,0.5 in the input grid. Other output pixels are interpolated as shown in table 802 of FIG. 8.

To accomplish this, the scaler 726 uses, for each direction, a configured "initial" position value (Init) and position "increment" value (Incr) in order to specify where the output pixels are interpolated from within the input pixel frame grid. In the current example, Init=1 and Incr=2, so that the output pixels will have 2× the spacing of the input pixels, effectively a 2:1 downscale.

In each direction, the scaler 726 maintains a position register to indicate the position on the input grid from which to interpolate the output pixel. This position starts with the Init value, and is advanced by the amount of the Incr value after each output pixel is generated in that direction.

Thus, for the horizontal direction, output_pixel[0] is generated at grid position Init, output_pixel[1] is generated at grid position Init+Incr, . . . and output_pixel[N] is generated at grid position Init+N*Incr.

It should be noted that the RGB to YUV conversion by RGB to YUV component 724 and/or the up-scaling or down-scaling by scaler 726 may be optional operations that may not be performed in all cases. Output streams (e.g., frames of image data processing using the various components described above in reference to FIG. 7) may be sent to one or more buffers of the AXI (or other streaming protocol) memory.

Figure 9:
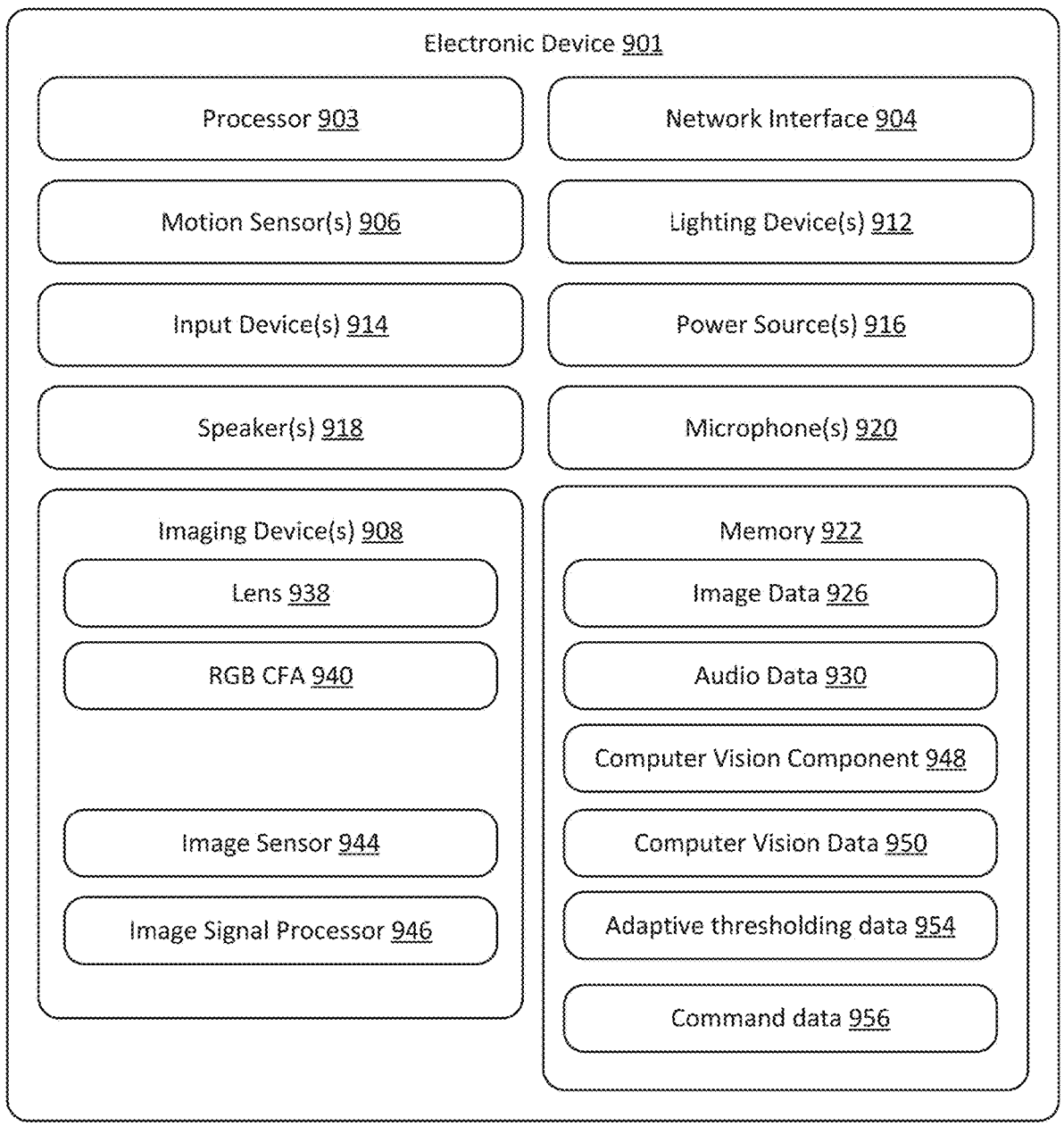
FIG. 9 is a block diagram showing an example architecture of a computing device that may be used in accordance with various aspects of the present disclosure.

FIG. 9 illustrates an example architecture of the electronic device 901. As shown, the electronic device 901 may include one or more processors 903, one or more network interfaces 904, one or more motion sensors 906, one or more imaging devices 908, one or more lighting devices 912, one or more input devices 914, one or more power sources 916, one or more speakers 918, one or more microphones 920, and memory 922.

The motion sensor(s) 906 may be any type of sensor capable of detecting and communicating the presence of an object within their field of view. As such, the motion sensor(s) 906 may include one or more (alone or in combination) different types of motion sensors. For example, in some embodiments, the motion sensor(s) 906 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 903, for example, to one or more threshold voltage values to determine if the amount of voltage in the output signal is indicative of motion, and/or if the amount of voltage in the output signal is indicative of motion of an object that is to be captured by the imaging device(s) 908. In some examples, the processor(s) 903 may determine the distance based on the amount of voltage in the output signal. Additionally, or alternatively, in some examples, the processor(s) 903 may determine the distance based on which motion sensor 906 detected the object.

Although the above discussion of the motion sensor(s) 906 primarily relates to PIR sensors, depending on the example, the motion sensor(s) 906 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906.

An imaging device 908 may include any device that includes an image sensor 944, such as a charge-coupled device (CCD) and/or an active-pixel sensor (CMOS sensor), that is capable of generating image data 926 (which may represent, and/or include, the frames of image data described herein), representing one or more images (e.g., a video). The imaging device 908 may include a lens 938 that is effective to focus light on the image sensor 944. As previously described, the light may be filtered by an RGB CFA 940 (e.g., a Bayer CFA). In one aspect of the present disclosure, the image sensor 944 may comprise a complementary metal-oxide semiconductor (CMOS) array and may be capable of recording high definition (e.g., 722p, 1800p, 4K, 8K, etc.) image and/or video files. The image sensor 944 may comprise a plurality of photosensors that may transform light into electrical signals. Such electrical signals may be represented by numerical values (e.g., floating point numbers) that may be processed using the image signal processor 946. Each photosensor of the image sensor 944 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 908 are in night mode. In some examples, the electronic device 901 may include an IR cut filter (not shown) to filter out infrared light from the light path of the photosensors when the electronic device 901 is configured in day mode. The IR cut filter may be removed from the light path such that infrared light may reach the photosensors when the electronic device 901 is configured in night mode.

The imaging device 908 may include a separate image signal process 946 (e.g., including image signal processor architecture 700 or some other desired architecture), or the processor(s) 903 may perform the camera processing functionality. The processor(s) 903 (and/or camera processor) may include an encoding and compression chip. In some embodiments, the processor(s) 903 (and/or the camera processor) may comprise a bridge processor. The processor(s) 903 (and/or the camera processor) may process video recorded by the image sensor and may transform this data into a form suitable for transfer by the network interface(s) 904. In various examples, the imaging device 908 also includes memory, such as volatile memory that may be used when data is being buffered or encoded by the processor(s) 903 (and/or the camera processor). For example, in certain embodiments the camera memory may comprise synchronous dynamic random-access memory (SD RAM).

The lighting device(s) 912 may be one or more light-emitting diodes capable of producing visible light and/or infrared light when supplied with power (e.g., to enable night vision). In some embodiments, when activated, the lighting device(s) 912 illuminates a light pipe. In some examples, the electronic device 901 uses the lighting device(s) 914 to illuminate specific components of the electronic device 901, such as the input device(s) 914. This way, users are able to easily see the components when proximate to the electronic device 901.

An input device 914 may include, but is not limited to, a button, a touch-sensitive surface, a switch, a slider, and/or any other type of device that allows a user to provide input to the electronic device 901. For example, if the electronic device 901 includes a doorbell, then the input device 914 may include a doorbell button. In some examples, based on receiving an input, the processor(s) 903 may receive a signal from the input device 914 and use the signal to determine that the input device 914 received the input. Additionally, the processor(s) 903 may generate input data representing the input received by the input device(s) 914. For example, the input data may represent the type of input (e.g., a push to a button), a time that the input occurred, and/or the like.

The power source(s) 916 may include one or more batteries that provide power to the electronic device 901. However, in other examples, the electronic device 901 may not include the power source(s) 916. In such examples, the electronic device 901 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 918 may be any electromechanical device capable of producing sound in response to an electrical signal input. The microphone(s) 920 may be an acoustic-to-electric transducer or sensor capable of converting sound waves into audio data 930 representing the sound. The speaker(s) 918 and/or microphone(s) 920 may be coupled to an audio CODEC to enable digital audio received by user devices to be decompressed and output by the speaker(s) 918 and/or to enable audio data captured by the microphone(s) 920 to be compressed into digital audio data 930. In some examples, the electronic device 901 includes the speaker(s) 918 and/or the microphone(s) 920 so that the user associated with the electronic device 901 can communicate with one or more other users located proximate to the electronic device 901. For example, the microphone(s) 920 may be used to generate audio data representing the speech of the one or more other users, which is then sent to the camera device 108. Additionally, the speaker(s) 918 may be configured to output user speech of the user, where the user's user speech may also be represented by audio data 930.

In some examples, the electronic device 901 determines that the start of the video is the first frame of the video. In some examples, such as when the electronic device 901 continuously generates the image data 926 (e.g., the electronic device 901 does not turn off the imaging device(s) 908), the start of the video corresponds to the portion of the video that the imaging device(s) 908 were generating right after detecting an event. For example, the start of the video may correspond to the first frame of the video after detecting the event. In other examples, such as when the electronic device 901 does not continuously generate the image data 926 (e.g., the electronic device 901 turns off the imaging device(s) 908 until detecting an event such as a motion event), the start of the video corresponds to the first frame of the video that is generated by the imaging device(s) 908.

As further illustrated in the example of FIG. 9, the electronic device 901 may include the computer-vision component 948. The computer-vision component 948 may be configured to analyze the image data 926 using one or more computer-vision techniques and output computer-vision data 950 based on the analysis. The computer-vision data 950 may represent information, such as the presence of an object represented by the image data 926, the type of object represented by the image data 926, locations of the object relative to the electronic device 901, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 950 may further represent a bounding box indicating the respective location of each object represented by the image data 926.

For example, the computer-vision component 948 may analyze the image data 926 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 948 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 948 may use object detection technique(s) that use computer-vision analysis to perform informative region selection, features extraction, and then classification of object(s) represented by the image data 926. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 901 may also store command data 956. In some circumstances, a user of the electronic device 901 may want to receive a live view from the electronic device 901. The command data 956 may represent an identifier associated with the electronic device 901, a command to generate the image data 926, a command to send the image data 926, and/or the like. In some examples, the electronic device 901 may then analyze the command data 956 and, based on the identifier, determine that the command data 956 is directed to the electronic device 901. For example, the electronic device 901 may match the identifier represented by the command data 956 to an identifier associated with, and stored by, the electronic device 901. Additionally, the electronic device 901 may cause the imaging device(s) 908 to begin generating the image data 926 (e.g., if the imaging device(s) 908 are not already generating the image data 926) and send the image data 926 to the one or more computing devices 102, the camera device 108, and/or another device.

Electronic device 901 may also store adaptive thresholding data 954 effective to cause processor 903 and/or image signal processor 946 to perform techniques associated with Day/night mode detection 118. As described above, Day/night mode detection 118 may be used to determine the brightness value Bv of the current scene (e.g., the most recently captured image data) and to adaptively determine the relevant thresholds $threshold_{day}$, $threshold_{night}$, and $\delta$. The logic and/or circuitry used to implement the Day/night mode detection 118 may be implemented in the image signal processor 946.

In various other examples, the adaptive thresholding data 954 may be used to implement the Day/night mode detection 118 as software executing on the image signal processor 946 and/or as some combination of software executing on the image signal processor 946 and hardware included in the circuitry of the image signal processor 946 or one or more different components. Similarly, the adaptive thresholding data 954 may be used to implement Day/night mode detection 118 as software executing on processor 903 and/or as some combination of hardware and software executing on processor 903. In addition some operations and/or components of Day/night mode detection 118 may be implemented by processor 903 (as hardware, software, and/or some combination thereof), while other operations and/or components of Day/night mode detection 118 may be implemented by image signal processor 946 (as hardware, software, and/or some combination thereof). The executable instructions associated with adaptive thresholding data 954, may be stored in memory 922 and/or in one or more separate memories, depending on the desired implementation.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 10:
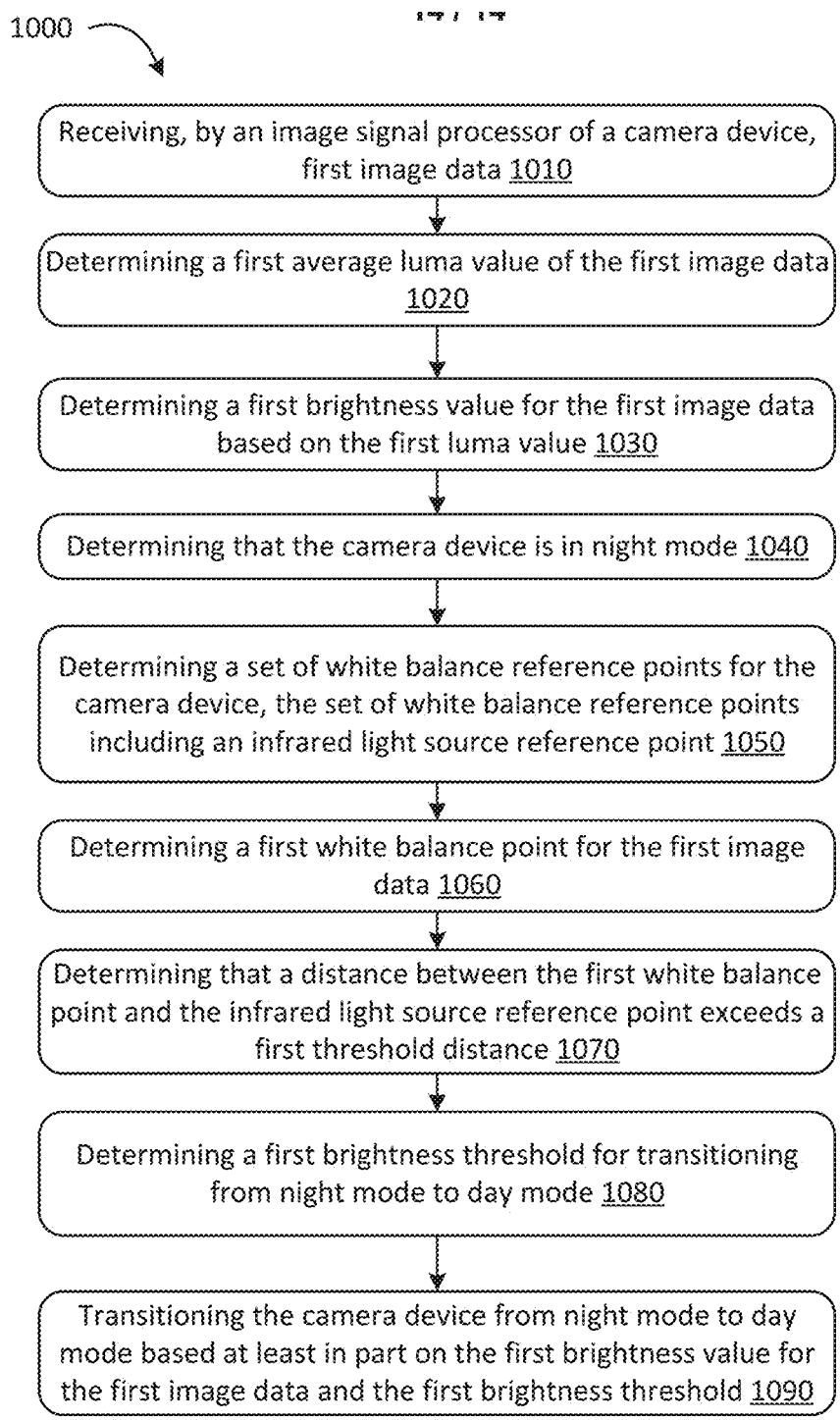
FIG. 10 is a flow diagram illustrating an example process for performing ISP-based day/night mode detection, in accordance with various aspects of the present disclosure.

FIG. 10 is a flow diagram illustrating an example process 1000 for performing ISP-based day/night mode detection, in accordance with various aspects of the present disclosure.

The process 1000 of FIG. 10 may be executed by day/night mode detection component 118, among other potential components of the image signal processor 110. The actions of process 1000 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 1000 may be described above with reference to elements of FIGS. 1-9.

Processing may begin at action 1010, at which an ISP of a camera device (e.g., camera device 108) may receive first image data (e.g., captured by photosensors of the camera device). Various statistics (e.g., 3A statistics) may be generated for the input image data. The various statistics may be used to determine a first average luma value of the first image data (e.g., of a downscaled version of the input image data) (action 1020).

Processing may continue at action 1030, at which a first brightness value Bv may be determined for the first image data based on the first luma value. The first brightness value may be determined by subtracting the exposure time and the ISO speed from the average luma value. Processing may continue at action 1040 at which a determination may be made that the camera device is currently in night mode. For example, indicator data may indicate the current mode of the camera device 108. In night mode, the LED light source of the camera device may be turned on, the IR cut filter may be removed, and the ISP may be configured with night mode settings/tunings.

Processing may continue at action 1050, at which a set of white balance reference points for the camera device may be determined. The set of white balance reference points may be determined for different illuminants including an infrared light source illuminant (which may, in turn, be associated with an infrared light source reference point). Each of the white balance reference points may be associated with per-channel (e.g., R, G, and B) gains and/or a CCM determined as previously described herein.

Processing may continue at action 1060, at which a first white balance point for the first image data may be determined. The first white balance point may be determined, for example, by interpolating between different white balance reference points for the most similar illuminants.

Processing may continue at action 1070, at which a determination may be made that a distance between the first white balance point and the infrared light source reference point exceeds a first threshold distance. The first threshold distance δ may be determined based on a minimum distance between the closest white balance reference point and the infrared illuminant reference point.

Processing may continue at action 1080, at which a first brightness threshold for transitioning from night mode to day mode may be determined. In various examples, the brightness threshold threshold$_{day}$ may be determined as described above in reference to FIGS. 6A-6D. Processing may continue at action 1090, at which the camera device may be transitioned from night mode to day mode based at least in part on the first brightness value for the first image data and the first brightness threshold. For example, the first brightness value for the first image data may exceed the first brightness threshold. When the camera device is transitioned to day mode, the infrared light source may be turned off and the IR cut filter may be positioned (e.g., mechanically actuated or otherwise activated) such that IR light is filtered out from the light path directed toward the photosensor.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
generating, by a camera of an electronic device while an infrared light source of the electronic device is emitting light, first image data;
determining a brightness value for the first image data based on an average luma value for the first image data;
determining, based on the first image data, white balance data for the first image data, the white balance data for the first image data comprising
a white balance red-to-green gains ratio for the first image data, and
a white balance blue-to-green gains ratio for the first image data;
determining, based on the white balance data for the first image data and white balance data for the infrared light source, a deviation value for the first image data; and
turning off the infrared light source based on
comparing the brightness value for the first image data to a first threshold, and
comparing the deviation value for the first image data to a second threshold.

2. The method of claim 1, wherein the method comprises:
storing fitting data determined based on
brightness values for a plurality of light sources, and
white balance data for the plurality of light sources;
determining a brightness ratio for the first image data based on
the white balance data for the infrared light source,
the fitting data, and
the white balance data for the first image data; and
determining the first threshold based on the brightness ratio for the first image data.

3. The method of claim 2, wherein the determining of the brightness ratio comprises
determining an angular value based on
the white balance red-to-green gains ratio for the first image data,
the white balance blue-to-green gains ratio for the first image data,
a white balance red-to-green gains ratio for the infrared light source, and
a white balance blue-to-green gains ratio for the infrared light source; and
determining the brightness ratio based on the angular value and the fitting data.

4. A method comprising:
emitting, by an infrared light source of an electronic device, light;
generating, by a camera of the electronic device, first image data;
determining, based on the first image data, a brightness value for the first image data;
determining, based on the first image data, white balance data for the first image data;
determining, based on the white balance data for the first image data and white balance data for the infrared light source, a deviation value; and
changing a setting of the electronic device based on
comparing the brightness value for the first image data to a first threshold, and
comparing the deviation value to a second threshold.

5. The method of claim 4, wherein the determining of the brightness value comprises
  determining an average luma value for the first image data; and
  subtracting an exposure time value and a speed value from the average luma value for the first image data.

6. The method of claim 4, wherein the determining of the white balance data for the first image data comprises determining
  a white balance red-to-green gains ratio for the first image data; and
  a white balance blue-to-green gains ratio for the first image data.

7. The method of claim 6, wherein the white balance data for the infrared light source comprises
  a white balance red-to-green gains ratio for the infrared light source; and
  a white balance blue-to-green gains ratio for the infrared light source.

8. The method of claim 4, wherein the first threshold was determined based on brightness values for a plurality of light sources.

9. The method of claim 4, wherein the first threshold was determined based on a night brightness value for a first light source of a plurality of light sources, the night brightness value for the first light source being greater than a night brightness value of any other light source of the plurality of light sources.

10. The method of claim 4, wherein the second threshold was determined based on
  white balance data for a plurality of light sources; and
  the white balance data for the infrared light source.

11. The method of claim 4, wherein the second threshold was determined based on a minimum deviation value of deviation values for a plurality of light sources, the deviation values having been determined based on white balance data for the plurality of light sources; and the white balance data for the infrared light source.

12. The method of claim 4, wherein the determining of the deviation value comprises determining the deviation value based on:
  a white balance red-to-green gains ratio for the first image data;
  a white balance blue-to-green gains ratio for the first image data;
  a white balance red-to-green gains ratio for the infrared light source; and
  a white balance blue-to-green gains ratio for the infrared light source.

13. The method of claim 4, wherein the changing of the setting of the electronic device comprises powering off the infrared light source of the electronic device.

14. The method of claim 4, wherein the changing of the setting of the electronic device comprises changing an operational state of an infrared cut filter.

15. The method of claim 4, wherein the changing of the setting of the electronic device comprises transitioning from a night mode to a day mode.

16. The method of claim 4, wherein the method comprises:
  storing fitting data determined based on
    brightness values for a plurality of light sources, and
    white balance data for the plurality of light sources;
  determining a brightness ratio for the first image data based on
    the white balance data for the infrared light source,
    the fitting data, and
    the white balance data for the first image data; and
  determining the first threshold based on the brightness ratio for the first image data.

17. The method of claim 16, wherein the first threshold is determined based on a third threshold.

18. The method of claim 17, wherein the infrared light source was powered on based on the third threshold.

19. The method of claim 16, wherein the fitting data was determined based on
  brightness ratio values for the plurality of light sources; and
  white balance data for the plurality of light sources.

20. The method of claim 19, wherein the fitting data was determined based on
  determining, for each respective light source of the plurality of light sources,
    a respective first value based on the white balance data for the infrared light source and white balance data for the respective light source, and
    a respective brightness ratio based on a day brightness value for the respective light source and a night brightness value for the respective light source; and
  determining one or more coefficient values for a quadratic function based on the first values for the plurality of light sources and the brightness ratios for the plurality of light sources;
  wherein the fitting data comprises the one or more coefficient values.

21. The method of claim 19, wherein the fitting data was determined based on
  determining, for each respective light source of the plurality of light sources,
    a respective first value based on the white balance data for the infrared light source and white balance data for the respective light source, and
    a respective brightness ratio based on a day brightness value for the respective light source and a night brightness value for the respective light source; and
  determining function data for a piecewise linear function based on the first values for the plurality of light sources and the brightness ratios for the plurality of light sources;
  wherein the fitting data comprises the function data.

22. The method of claim 19, wherein the fitting data was determined based on
  determining, for each respective light source of the plurality of light sources,
    a respective first value based on the white balance data for the infrared light source and white balance data for the respective light source, and
    a respective brightness ratio based on a day brightness value for the respective light source and a night brightness value for the respective light source; and
  determining lookup data for a lookup table based on the first values for the plurality of light sources and the brightness ratios for the plurality of light sources;
  wherein the fitting data comprises the lookup data.

23. The method of claim 16, wherein the determining of the brightness ratio comprises
  determining a first value based on
    a white balance red-to-green gains ratio for the first image data, a white balance blue-to-green gains ratio for the first image data, a white balance red-to-green gains ratio for the infrared light source, and a white balance blue-to-green gains ratio for the infrared light source; and determining the brightness ratio based on the first value and the fitting data.

24. The method of claim 23, wherein the first value is an angular value.

25. The method of claim 16, wherein the determining of the brightness ratio comprises determining the brightness ratio using a quadratic function, a piece-wise linear function, or a lookup table.

26. The method of claim 4, wherein the method comprises:

generating, by the camera of an electronic device while the infrared light source of the electronic device is emitting light, second image data;

determining, based on the second image data, a brightness value for the second image data;

determining, based on the second image data, white balance data for the second image data;

determining, based on the white balance data for the second image data and the white balance data for the infrared light source, a second deviation value; and determining whether to change a setting of the electronic device based on comparing the brightness value for the second image data to a first threshold, and comparing the deviation value to a second threshold.

27. The method of claim 4, wherein the method comprises:

generating, by the camera of an electronic device while the infrared light source of the electronic device is not emitting light, second image data;

determining, based on the second image data, a brightness value for the second image data;

determining whether to change a setting of the electronic device based on comparing the brightness value for the second image data to a third threshold.

28. The method of claim 16, wherein the method comprises:

generating, by the camera of an electronic device while the infrared light source of the electronic device is not emitting light, second image data;

determining, based on the second image data, a brightness value for the second image data;

determining whether to change a setting of the electronic device based on comparing the brightness value for the second image data to a third threshold;

wherein the determining of the first threshold is based on the third threshold.

29. The method of claim 16, wherein the determining of the white balance data for the first image data comprises determining a white balance red-to-green gains ratio for the first image data, and a white balance blue-to-green gains ratio for the first image data;

wherein the white balance data for the infrared light source comprises a white balance red-to-green gains ratio for the infrared light source, and a white balance blue-to-green gains ratio for the infrared light source; and wherein the white balance data for the plurality of light sources comprises, for each light source of the plurality of light sources, a white balance red-to-green gains ratio for that light source, and a white balance blue-to-green gains ratio for that light source.

* * * * *